United States Patent [19]

O'Brien et al.

[11] Patent Number: 4,610,309
[45] Date of Patent: Sep. 9, 1986

[54] DOWNHOLE TOOL

[75] Inventors: John T. O'Brien; Donald D. Goff; Gary M. Hoover, all of Bartlesville, Okla.

[73] Assignee: Phillips Petroleum Company, Bartlesville, Okla.

[21] Appl. No.: 677,001

[22] Filed: Nov. 30, 1984

[51] Int. Cl.⁴ .............................................. E21B 23/00
[52] U.S. Cl. .................... 166/382; 166/206
[58] Field of Search ............... 175/215, 212, 214, 325, 175/97, 98, 4.51, 4.52; 166/382, 206, 241, 100, 124, 209, 134, 98, 89, 242, 243, 75, 65; 294/86.25, 86.14, 86.03; 284/82; 74/105, 89.15

[56] References Cited

U.S. PATENT DOCUMENTS

| | | | |
|---|---|---|---|
| 1,092,508 | 4/1914 | Robinson | 166/215 |
| 2,222,405 | 11/1940 | Cox et al. | 166/206 |
| 2,428,168 | 9/1947 | Loper | 177/352 |
| 2,667,109 | 1/1954 | Piety | 95/11 |
| 2,846,662 | 8/1958 | Sparks | 340/15 |
| 3,475,722 | 10/1969 | White | 340/15.5 |
| 3,876,971 | 4/1975 | Wuenschel | 340/15.5 |
| 3,978,939 | 7/1974 | Trouiller | 181/104 |
| 4,088,185 | 5/1978 | Carson | 166/241 X |
| 4,130,816 | 12/1978 | Vogel et al. | 340/15.5 BH |
| 4,148,375 | 4/1979 | Dowler et al. | 181/117 |
| 4,289,025 | 9/1981 | Norel et al. | 73/152 |
| 4,291,764 | 9/1981 | Pampell | 166/173 |
| 4,365,668 | 12/1982 | Bright et al. | 166/214 |
| 4,380,806 | 4/1983 | Waters et al. | 367/27 |
| 4,428,422 | 1/1984 | Laurent | 166/212 |
| 4,435,978 | 3/1984 | Glantz | 166/250 X |

Primary Examiner—Stephen J. Novosad
Assistant Examiner—David J. Bagnell
Attorney, Agent, or Firm—John R. Casperson

[57] ABSTRACT

For a downhole seismic tool, a securing mechanism which uses an arm which swings from the side of tool and into contact with the earth, causing the tool also to come to rest against the opposite side of the borehole on at least one pair of lugs protruding from the opposite side of the tool.

18 Claims, 7 Drawing Figures

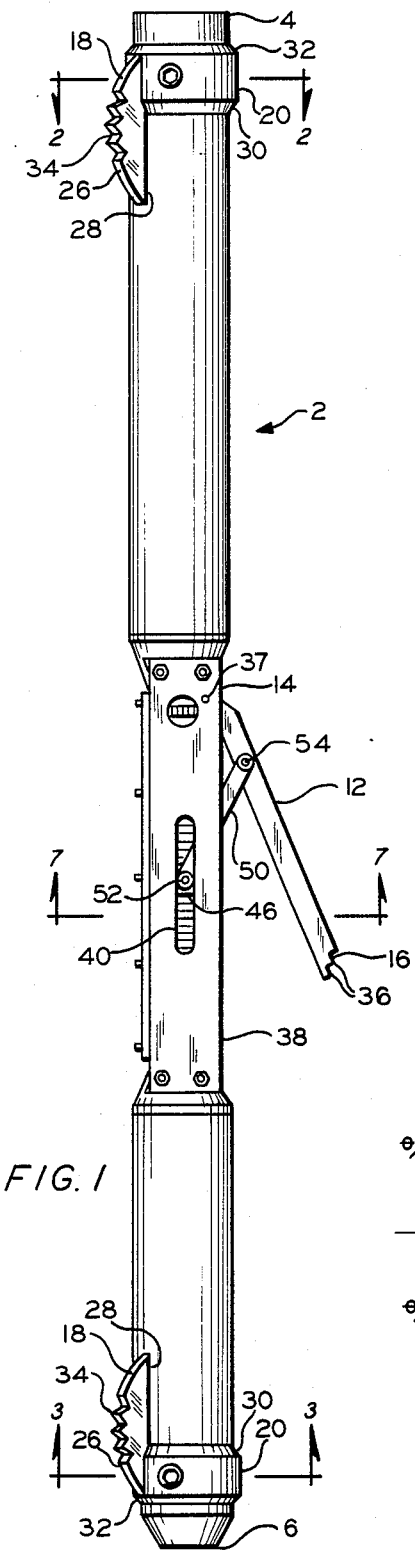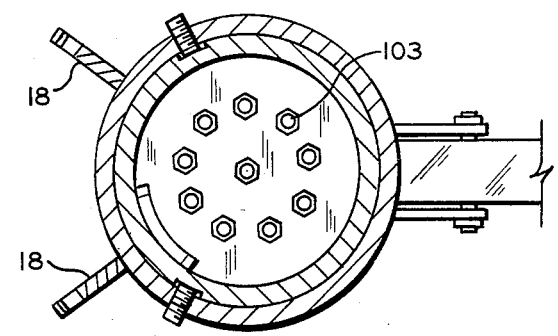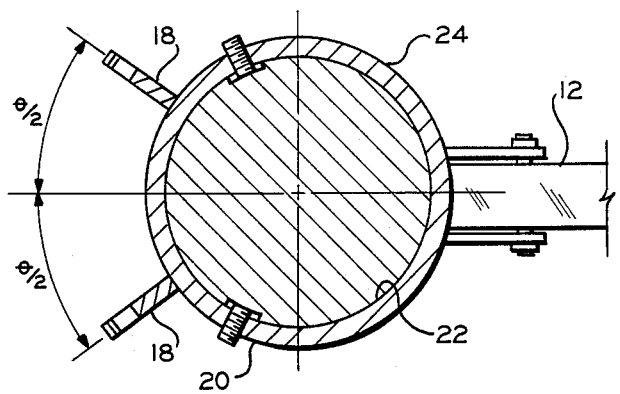
FIG. 1
FIG. 2
FIG. 3

DOWNHOLE TOOL

BACKGROUND OF THE INVENTION

In one aspect, the invention relates to downhole tool. In another aspect, the invention relates to securing a downhole tool in a borehole. In yet another aspect, the invention relates to fixtures for a downhole tool.

Where seismic data is obtained from a tool positioned downhole, the best results are obtained when the tool is tightly secured to the formation. This is because measurements of seismic wave motion are distorted by a loose tool and do not provide the operator with signals representative of the seismic waves in the surrounding formation. The weight of downhole tools (from 50 up to several hundred pounds) is known to cause difficulty in securing the tool to the earth. It would be very desirable to provide a downhole tool which can be firmly secured downhole in a highly reliable manner.

Another problem encountered in data measurement with downhole tools is that boreholes vary in diameter. For example, drill bits may be used to bore a hole having a diameter ranging from a few to many inches in diameter. Also, the earth formation may shift to partly pinch off the bore downhole or the borehole may become eroded to a locally larger diameter. Thus the diameter of the bore in the same hole may vary. A downhole tool which can be easily adapted to accommodate changing or changed borehole diameters would be very desirable.

Distortion between seismic waves and the recording made by a downhole device can also occur at the interface between the device and the borehole wall due to a poor plant. In certain prior art devices, the downhole tool was locked to the hole wall by an arm providing securing forces in a single plane. Distortion in the measurement of borehole wall motion in directions outside of the locking plane was common. A downhole tool positioned by locking forces in more than one plane is clearly desirable.

OBJECTS OF THE INVENTION

It is an object of this invention to provide a downhole tool which can be reliably positioned in a borehole.

It is another object of this invention to provide a fixture for adapting a downhole tool to accommodate changing and changed borehole diameters.

It is another object of this invention to provide a downhole tool which can be sufficiently secured to the earth to provide undistorted measurement of displacements of the borehole wall as a result of seismic waves.

It is another object of this invention to provide a method for positioning a tool in a borehole.

STATEMENT OF THE INVENTION

In one aspect of the invention, there is provided a collar suitable for positioning on a generally cylindrical tool suitable for downhole use. The collar has a longitudinal axis, a generally cylindrical interior surface, and a generally cylindrical exterior surface. A pair of lugs are provided on the generally cylindrical exterior surface which extend generally radially outward. The lugs are separated by an acute angle as measured circumferentially with respect to the longitudinal axis of the collar. By changing the size of the lugs, the downhole tool can be adapted for being reliably secured in boreholes of various diameters in a highly convenient manner. Where the lug has a segmental shape, it is much less likely to hang up during either the raising or lowering of the tool.

In another aspect of the invention there is provided a mechanism for securing a tool in a borehole. An arm is pivotally connected to a shaft which connects a pair of parallel plates. The parallel plates have matching slots spaced apart from the shaft and a carrier rides up and down in the slots. A link between the carrier and the arm causes the arm to swing in and out in a plane between the two plates as the carrier moves. The carrier is moved by the rotation of a threaded screw positioned between the plates and in alignment with and parallel to the slots and engaged with the carrier. A motor causes the rotation of the screw around the longitudinal axis of the screw. By providing the locking mechanism in a midsection of a downhole tool the tool can be wedged in the borehole by actuation of the motor. By changing the length of the arm, different diameter boreholes can be accommodated.

In yet another aspect of the invention provision is made for positioning an elongated tool body in a borehole. The tool body has a first end and a second end and an arm having a first end and a second end is connected by its first end to the elongated tool body. The arm is movable in the direction radially inwardly and outwardly from the elongated tube body. On the opposite side of the tool body from the arm at least one pair of lugs extend generally radially outwardly. The lugs are longitudinally positioned between the arm and at least one end of the tool body and are separated circumferentially by an acute angle. The lugs are positioned so that the angle which separates them is generally bisected by the plane defined by the longitudinal axis of the tool body and the radial direction of movement of the arm. Actuation of the arm will bring the lugs and the arm into contact with the borehole wall and the tool will become reliably positioned in the borehole. By providing locking lugs at each end of the tool there is provided a five point locking system in which the tool is stable against movement in any direction.

In another aspect of the invention there is provided an improvement for positioning an elongated tool in a borehole. By supporting the tool on at least one pair of legs which protrude opposite from the side of the tool on which there is an arm movable into contact with the wall of the borehole a stable four or five point contact mounting system between the tool and the wall of the borehole results and the tool can be readily adapted to accommodate different diameter boreholes.

BRIEF DESCRIPTION OF THE DRAWING

FIG. 1 illustrates pictorially certain features of one embodiment of the present invention.

FIG. 2 is a cross-sectional representation of the device of FIG. 1 when viewed along lines 2—2.

FIG. 3 is a cross sectional representation of the device of FIG. 1 when viewed along lines 3—3.

DETAILED DESCRIPTION OF THE INVENTION

Figure 4:
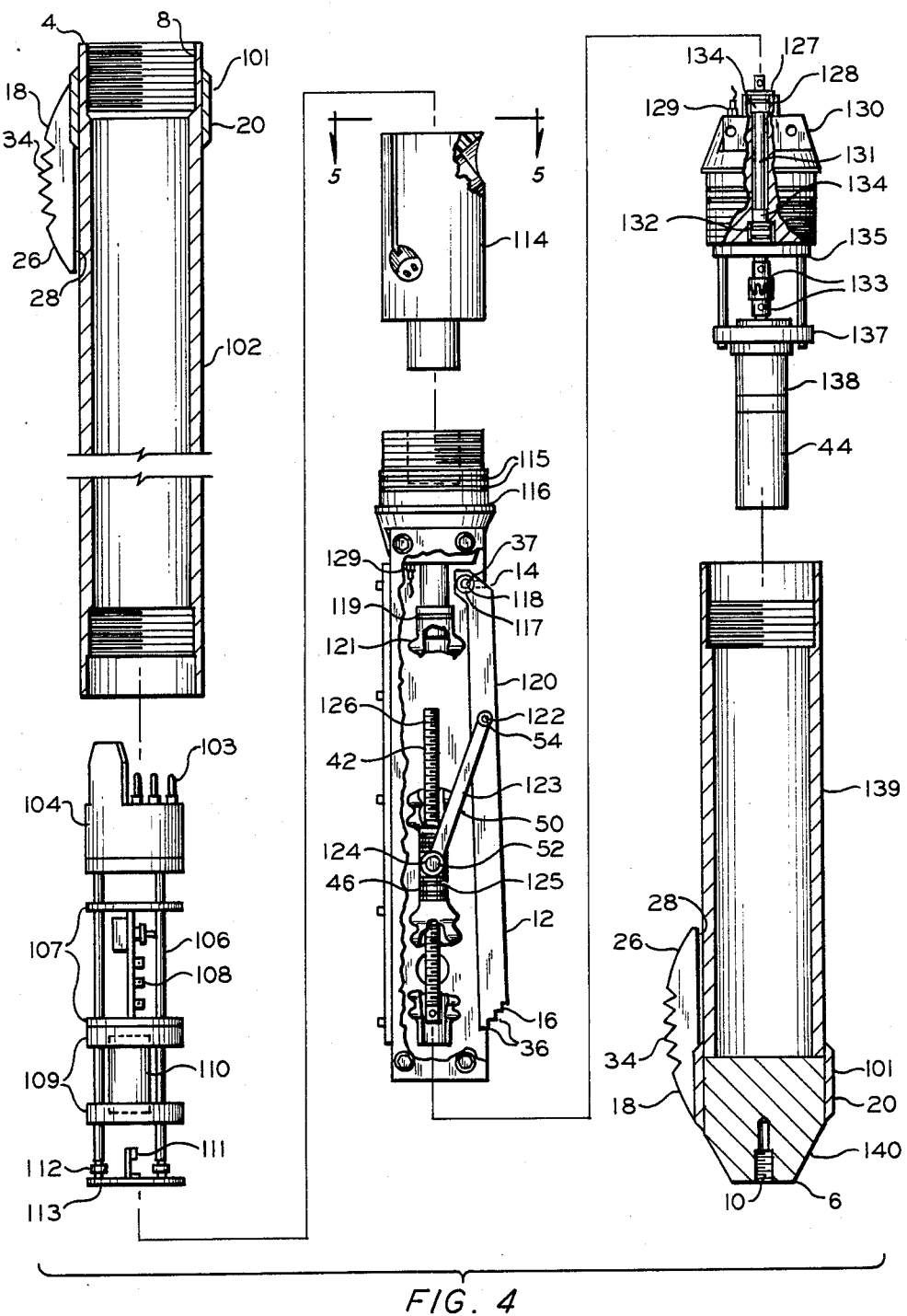
FIG. 4 is an exploded view of the device of FIG. 1 with certain of the elements taken in cross section or with portions broken away to show internal details.

In one embodiment of the invention, there is provided an apparatus 2 in the form of an elongated tool body 2 suitable for downhole use. The apparatus has an upper end 4 and a lower end 6. The upper end 4 is preferably provided with threads 8 for connecting a wire line fitting, not shown. A threaded fitting 10 at the lower end 6 provides a means for affixing additional weights to the tool to increase its density, so it can settle through dense mud, for example, if needed.

An arm 12 has a first end 14 connected to the tool body and a second end 16. The arm 12 is movable in a direction radially inwardly and radially outwardly from the elongated tool body with respect to a longitudinal axis of the tool body.

At least one pair of lugs 18 extend generally radially outwardly from the tool body at a position between the arm 12 and at least one of the ends 4 and 6. The pair of lugs 18 are separated by an acute angle theta as measured circumferentially with respect to the longitudinal axis of the tool and are positioned on the opposite side of the tool body from the arm 12 such that the acute angle theta separating the lugs 18 is generally bisected by the plane determined by the radial direction of movement of the arm 12 and the longitudinal axis of the tool body. Generally speaking, the lugs 18 will be separated by an angle theta ranging from about 30°° to about 85° . Preferably, the angle of separation of the lugs 18 ranges from about 45° to about 80°.

It is preferred that the lugs 18 be attached to a collar 20 such as by welding. The collar 20 has a longitudinal axis which preferably corresponds to the longitudinal axis of the tool body, a generally cylindrical interior surface 22 and a generally cylindrical exterior surface 24. The pair of lugs 18 are mounted to the generally cylindrical exterior surface of the collar 20. In a preferred embodiment, each of the lugs 18 has a generally circularly segmental shape having an arc 26 and a chord 28. The chord is positioned generally parallel to the longitudinal axis of the collar. By providing the lug with such a shape the risk of the tool becoming lodged in the bore hole is substantially reduced. In a preferred embodiment, each collar 20 has a first end 30 and second end 32. Each of the collars is mounted so that the end 32 is positioned toward an adjacent end 4 or 6 of the tool. The collar 20 has a length which is measured between first and 30 and second and 32. The length of the lug 18 is measured along the chord 28 and is preferably greater than the length of the collar 20, such as in the range of 1.2 to 3 times the length of the collar 20. By forming the collar and lugs in this manner the shape of the lugs can be more rounded and the risk of tool hang up further reduced. The lugs preferably protrude beyond the end 30 of the collar in the direction of the arm 12. The risk of hang-up can be further reduced by bevelling the collar 20 at each of the first end 30 and the second end 32. In a preferred embodiment of the invention, the arc 26 of each lug is interrupted by teeth 34 so as to better grip the borehole wall when the arm 12 is actuated to urge the lugs into contact with the borehole wall. Further, by providing the second end 16 of the arm 12 with teeth 36 the tool Z can be provided with even greater stability when the arm 12 is actuated.

In a preferred embodiment of the invention, the arm 12 is pivotally connected to the tool body via a shaft 37. The shaft 37 extends between a pair of spaced apart parallel plates 38 and 39, preferably normal to the plates. Each of the plates 38 and 39 has a slot 40 or 41 through it which matches the slot in the other plate of the pair. A threaded screw 42 is positioned between the plates 38 and 39 and is in alignment with and parallel to the slots 40 and 41. A motor 44 is connected to the screw 42 to cause the rotation of the screw about the longitudinal axis of the screw. A carrier 46 rides the screw 42 as the screw 42 is rotated by the motor 44. Ears formed by a short shaft 48 on the carrier 46 engage with the slots 40 and 41 in the plates to prevent the rotation of the carrier. Preferably, bushings are used between the shaft 48 and the slot 40 and 41. A link 50 having a first end 52 and a second end 54 is pivotally connected by its second end 54 to the arm 12 between the first end 14 and the second end 16 of the arm and is pivotally connected by its first end 52 to the carrier 46. Preferably, a pair of links, 50 and 56 connect the carrier 46 and the arm 12. Where a pair of links 50 and 56 are employed, the arm 12 is preferably provided with a pair of side surfaces 58 and 60 which are positioned in planes parallel to the pair of plates 38 and 39. The links 50 and 56 are pivotally connected to the sides 58 and 60 of the arm 12 one link to each side, and to the carrier. The length of the arm 12 is preferably selected based on the diameter of the borehole wall so that the links 50 and 56 are about normal to the arm 12 when the arm 12 is at full extension.

By providing the apparatus with at least one pair of legs or lugs protruding from the side of the tool opposite to the side having the arm there is provided 4 or 5 point contact between the tool and the wall of the borehole. Where only one pair of lugs are provided near one end of the tool the 4 point contact is determined by the pair of lugs, the arm, and the end of the tool not having the legs or lugs. Where each end of the tool is provided with a pair of legs or lugs, there is determined 5 point contact by the two pair of legs or lugs and the locking arm and this is preferred. By swinging the arm into contact with the wall of the borehole a high amount of force can be applied to reliably lock the device in the hole. An operator at the surface control unit can readily determine when the tool is locked tight against the borehole wall by observing the amperage load to the motor. Alternatively, a sensor could be provided near the end 14 of the locking arm to determine the position of the arm.

EXAMPLE OF THE PREFERRED EMBODIMENT

A device as illustrated in FIG. 4 is described.

Two lug collars 101 are formed from 316 stainless steel. The collars are secured against longitudinal and rotational movement by set screws seated in a circumferential groove in each of case 102 and 139 which allows for rotational alignment (see FIGS. 2 and 3). The lugs are separated by an angle of 70°. The upper case 102 is made from 316 stainless steel tubing. Ten banana plugs 103 extend through a connector body 104 formed from 6061 aluminum. Three 6061 aluminum coupling rods 106 connect the connector body 104 with a pair of Lexan amplifier board supports 107, a pair of Teflon battery holders 109, and a coupling rod ring 113. The ring 113 is mounted to the lower end of the rods 106 by yellow brass nuts 112. The supports 107 carry an amplifier assembly 108 which was not used in practice. The battery holders carry a pair of D-cell batteries 110. A terminal block/bracket 111 is positioned at the lower end of the coupling rods 106 on the aluminum rod ring 113.

Figure 5:
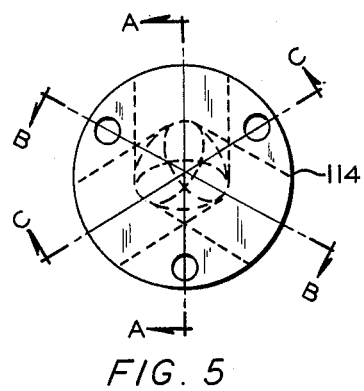
FIG. 5 is a view of a portion of the device as shown in FIG. 4 along lines 5—5 illustrating a geophone arrangement which can be used with the invention.
Figure 6:
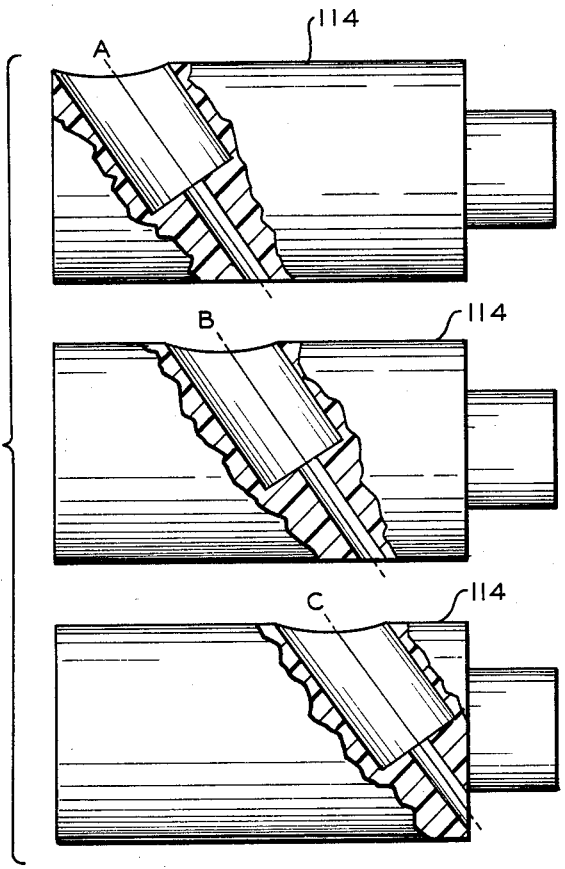
FIG. 6 illustrates certain features of the invention as shown in FIG. 5 from various cross-sectional cuts as through the dotted lines in FIG. 5.
Figure 7:
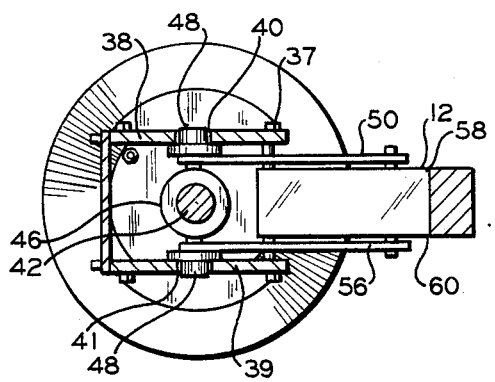
FIG. 7 is a cross section of the portion of the apparatus as shown in FIG. 1 when viewed along lines 7—7.

A suitable geophone holder 114 can be made from Teflon ® or Marlex ® polymers. Other types of holders can also be used, such as a conventional X,Y,Z arrangement. In the illustrated embodiment, the geophone holder carries three mutually orthogonally positioned 54.735° geophones. The 54.735° angle is measured from the vertical. The geophones are positioned in mutually orthogonal directions by having their principal axis of sensitivity set apart from each other at an angle of 120° when projected on the horizontal plane as best shown in FIGS. 5 and 6. This provides a compact arrangement.

An upper bulkhead 116 of the arm unit is threadably attached to the upper case 102. A pair of Parker 2-233 O-ring seals 115 provide a water tight seal at the joint. The pivot arm 120, which can be of various lengths, is mounted to yellow brass pivot pin 118 retained to the aluminum side plates by a pair of bushings 117 which can be formed from yellow brass. A pair of bellows 121, Minor Rubber Company ZFB-1059-B are attached to 125, 116 and 130 by nylon ties 119. A pair of arm links 123 are pivotally attached to a yellow brass arm actuator body 125. Nylon bushings 124 guide the activator body 125 along the slots. A pair of pins 122 of yellow brass attach the link 123 to the arm 120.

The motor bulkhead 130 can be formed from 316 stainless steel. The power shaft 131 extending through bulk head 130 can be formed from stainless steel. The annulus around the shaft 131 is sealed by a 304 stainless steel Bal-seal retainer 127 and a Bal-seal 109-504G seal 128. Mecca 2214 connectors 129 provides for electrical passage through the bulkheads 130 and 116. It will be appreciated that electrical lines between the top hole and the motor 44 have not been shown in the FIGURE in the interest of clarity. The shaft 131 is supported by a pair of "Bunting" 5/16 ID by ½ OD by ⅜ inch length bearings 134 and a pair of "Torrington" NTA-512, TRB-512 thrust bearings 132 with washers. A TRW BL-17, 108728 planetary gear motor 138 is coupled to the shaft 131 by a pair of "Boston gear" FA-75 couplings 133. A yellow brass bulkhead plate 135 supports the bearings 132. A yellow brass motor mount 137 supports the motor. The motor case 139 is suitably formed from 316 stainless steel as is the motor case cap 140.

What is claimed is:

1. A collar suitable for use on an elongated well tool, said collar having a longitudinal axis, a generally cylindrical interior surface for receiving the elongated well tool, and a generally cylindrical external surface and pair of lugs extending generally radially outward from the generally cylindrical exterior surface of the collar, said lugs being separated by an acute angle with respect to the longitudinal axis of the collar for engagement with a well bore wall when an arm on the opposite side of the elongated well tool from the pair of lugs is actuated.

2. A collar as in claim 1 wherein each of the lugs has a generally circularly segmental shape with an arc and a chord and the chord of the segment is positioned parallel to the longitudinal axis of the collar.

3. A collar as in claim 2 which has a first end and second end and a length defined between the first end and the second end and the length of the chord of the lug is greater than the length of the collar.

4. A collar as in claim 3 which is beveled at the first end and at the second end.

5. A collar as in claim 4 wherein the arc of the segment is interrupted by teeth.

6. Apparatus as in claim 5 wherein the lugs are separated by an angle in the range of from about 45° to about 80°.

7. Apparatus comprising:
(a) pair of spaced apart parallel plates each having a slot which matches a slot in the other plate of the pair;
(b) a threaded screw positioned between the plates and in alignment with and parallel to the slots;
(c) a motor connected to the screw to cause the rotation thereof about its longitudinal axis;
(d) a carrier riding the screw and engaged with the slots so as to prevent rotation of the carrier;
(e) a shaft spaced apart from the slots connecting the pair of plates;
(f) an arm having a first end and a second end pivotally connected to the shaft by its first end for movement in a plane between the two plates; and
(g) a link having a first end and a second end pivotally connected by its first end to the arm between the first and the second end of the arm and pivotally connected by its second end to the carrier; and
(h) a plurality of teeth positioned on the second end of the arm; wherein he arm has a pair of plates; and wherein a pair of links are pivotally connected to the sides of the arm, one link to each side, and to the carrier.

8. Apparatus comprising:
(a) An elongated tool body having first end, a second end and a longitudinal axis;
(b) an arm having a first end and a second end connected by its first end to the elongated tool body, said arm being movable in a direction radially inwardly and outwardly from the elongated tool body;
(c) at least one pair of lugs extending generally radially outwardly from the tool body at a position between the arm and at least one end of the tool body, said pair of lugs being separated by an acute angle and in position on the opposite side of the tool body from the arm such that the acute angle separating the lugs is generally bisected by a plane determined by the of the radial direction of movement of the arm and the longitudinal axis of the tool body.

9. An apparatus as in claim 8 having a first pair of lugs and a second pair of lugs, the first pair of lugs being positioned near the first end of the tool body, the second pair of lugs being positioned near the second end of the tool body.

10. Apparatus as in claim 9 further characterized by teeth on the lugs and on the second end of the arm.

11. Apparatus as in claim 9 further comprising a screw shaft positioned along the longitudinal axis of the tool body, a motor to rotate the screw shaft about the longitudinal axis of the screw shaft, said motor contained in the tool body, a carrier mounted on the screw shaft to travel up and down the screw shaft as the screw shaft is rotated, and a linkage connected to the carrier and the arm to swing the arm in an out from the tool body upon actuation of the motor, said arm being pivotally connected by its first end to the tool body.

12. An apparatus as in claim 11 further comprising a plurality of seismic transducers positioned in the elongated tool body.

13. In the positioning of an elongated tool in a well bore hole by moving an arm radially outward from the body of the tool so that the end of the arm contacts the wall of the bore hole, the improvement comprising supporting the tool on at least one pair of lugs protruding from the side of the tool opposite to the arm so that there is point contact of at least 4 points between the tool and the wall of the bore hole.

14. A method as in claim 12 wherein there is 4 point contact between the tool and the wall of the bore hole.

15. A method as in claim 14 wherein the 4 point contact is provided by a pair of lugs, the arm, and an end of the tool.

16. A method as in claim 13 wherein there is 5 point contact between the tool and the wall of the bore hole.

17. A method as in claim 11 wherein the 5 point contact is provided at a first pair of lugs positioned near the first end of the tool, a second pair of lugs positioned near the second end of the tool, and the end of the arm.

18. A method as in claim 17 wherein the arm swings into contact with the wall of the borehole.

* * * * *